Figure 3:
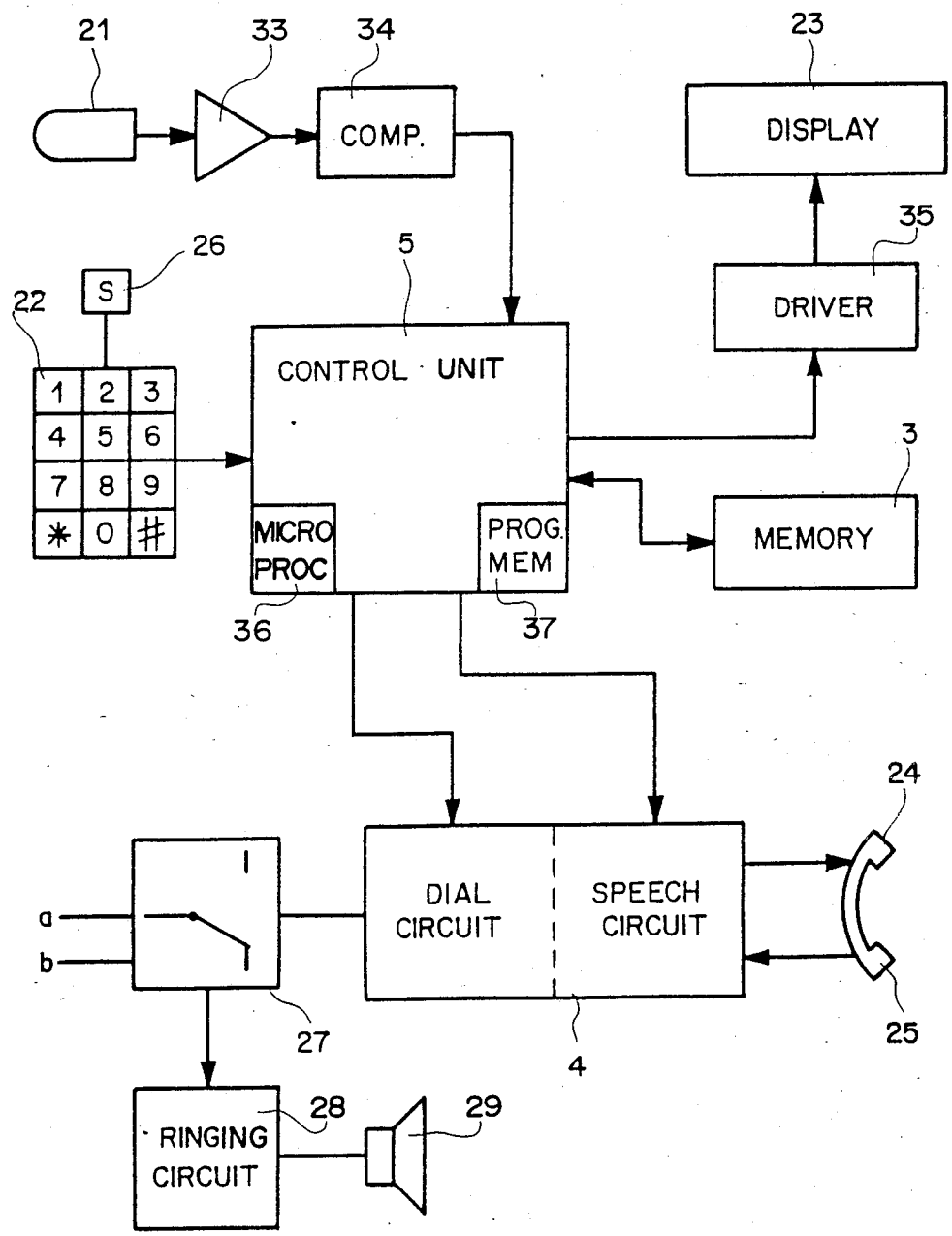

United States Patent [19]

Seiler et al.

[11] Patent Number: 4,907,264
[45] Date of Patent: Mar. 6, 1990

[54] TELEPHONE SET WITH SUBSCRIBER LISTING

[75] Inventors: Christian Seiler, Solothurn; Markus Häni, Biel, both of Switzerland

[73] Assignee: Autophon Telecom AG, Solothurn, Switzerland

[21] Appl. No.: 244,071

[22] Filed: Sep. 14, 1988

[30] Foreign Application Priority Data

Sep. 14, 1987 [CH] Switzerland .................. 3345/87

[51] Int. Cl.⁴ ............................................. H04M 1/26
[52] U.S. Cl. .................................... 379/355; 379/216; 379/354
[58] Field of Search ............... 379/216, 354, 355, 356, 379/357, 358, 359

[56] References Cited

U.S. PATENT DOCUMENTS

| | | | |
|---|---|---|---|
| 4,042,792 | 8/1977 | Pakenham et al. | 379/355 |
| 4,535,204 | 8/1985 | Hughes | 379/357 |
| 4,759,056 | 7/1988 | Akiyama | 379/216 X |

FOREIGN PATENT DOCUMENTS

| | | |
|---|---|---|
| 2939196 | 4/1981 | Fed. Rep. of Germany. |
| 3011511 | 10/1981 | Fed. Rep. of Germany ...... 379/355 |
| 3245203 | 3/1984 | Fed. Rep. of Germany ...... 379/357 |
| 0240741 | 10/1986 | Japan .................................... 379/355 |

Primary Examiner—James L. Dwyer
Attorney, Agent, or Firm—Oblon, Spivak, McClelland, Maier & Neustadt

[57] ABSTRACT

In a housing (20) taking the form of a microtelephone, a dial-speech circuit (4), a receiver (24), a transmitter (25), a control unit (5), and a key pad (22) are accommodated. The telephone set further includes a subscriber listing (1) divided into sections (11). In each section a bar code (13) corresponding to a speed-calling number (12) is printed, and space is left free for writing in the name of a telephone subscriber and high or her telephone number (14). Disposed at one corner of the housing is an optical transmitter-receiver (21) which, together with the housing, forms a hand-held bar-code reading wand. Connected to the control unit is a memory (3) having storage locations defined by the speed-calling numbers, at each of which locations a certain telephone number (32) is stored. By using the hand-held wand to read the speed-calling number storage code in the subscriber listing, the associated telephone number is automatically dialed by the control unit.

6 Claims, 4 Drawing Sheets

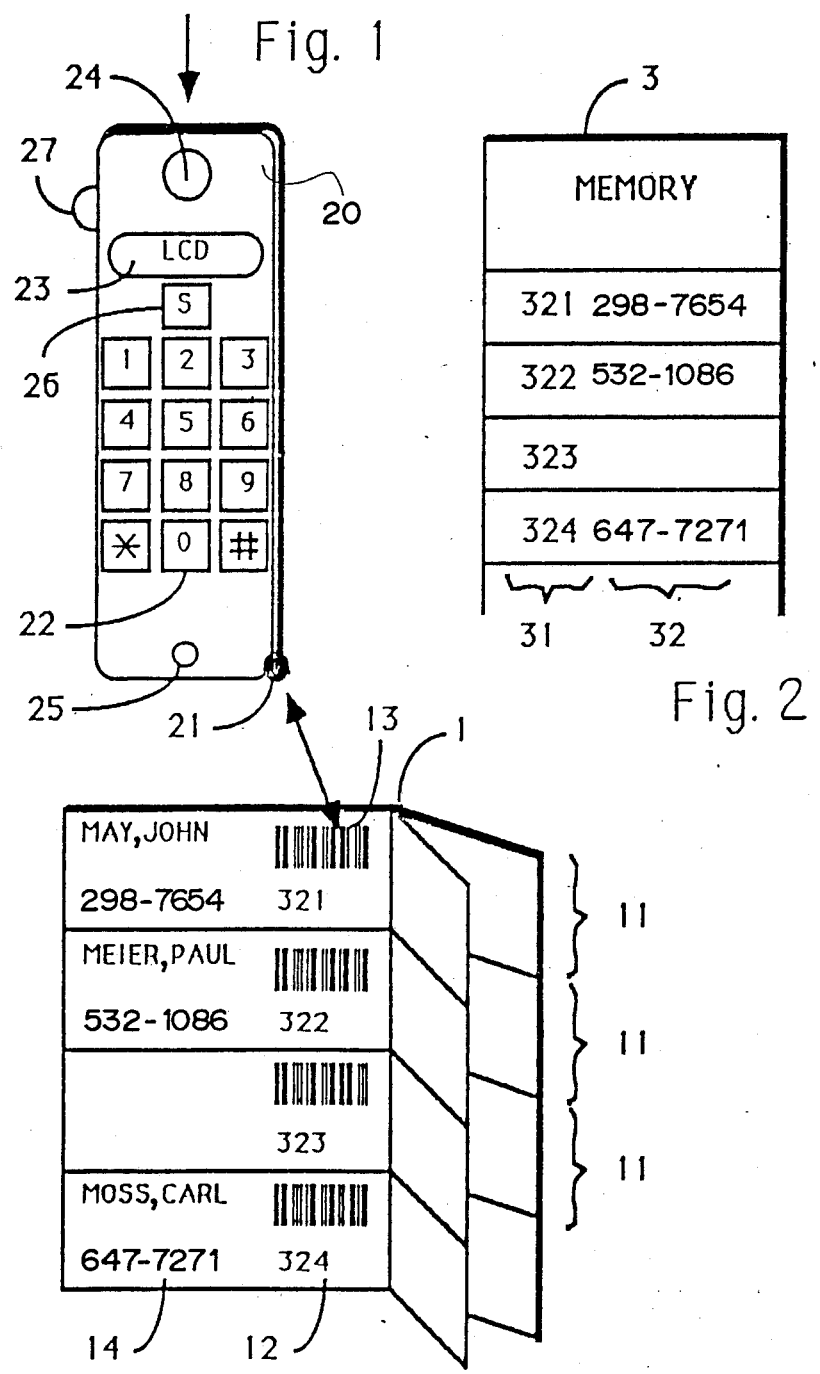

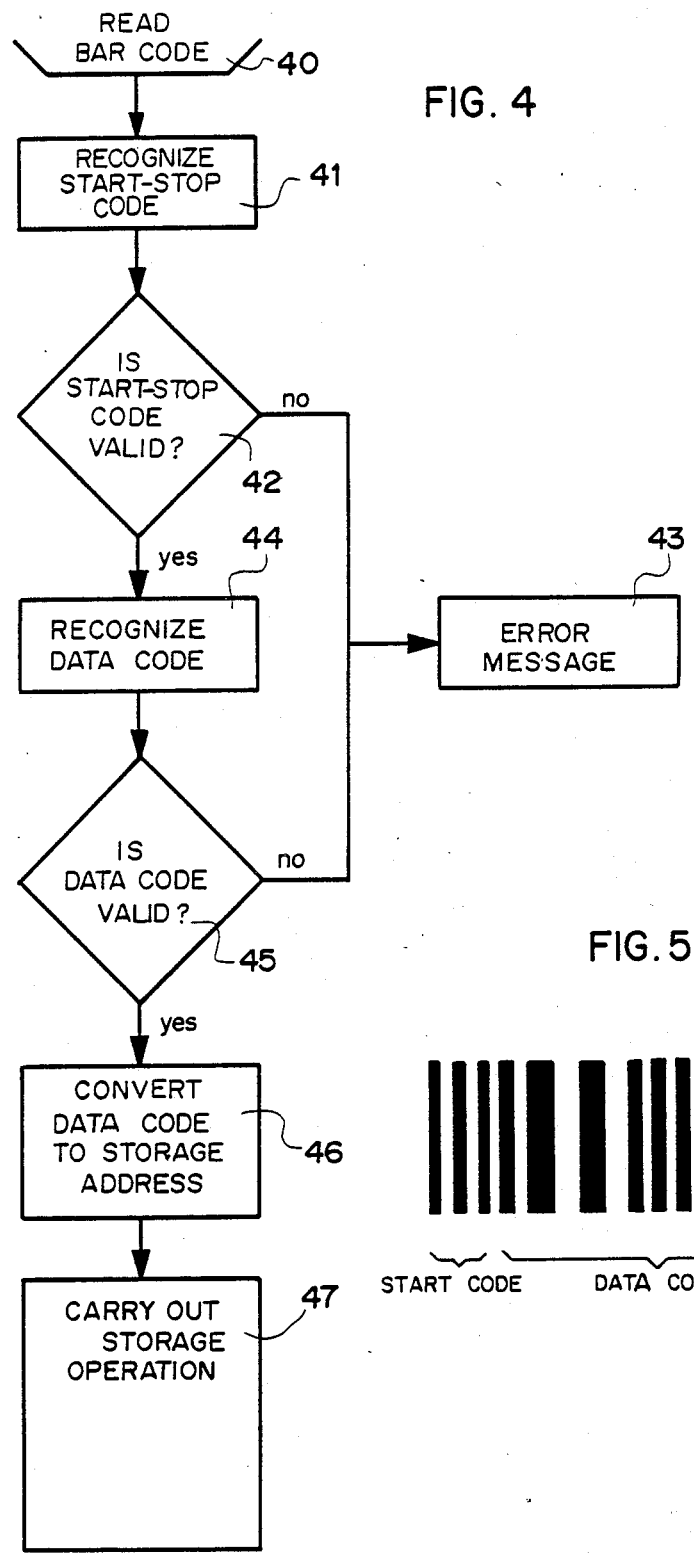

TELEPHONE SET WITH SUBSCRIBER LISTING

This invention relates to telephone equipment, and more particularly to a telephone set of the type having a subscriber listing containing bar codes and associated subscriber numbers, a bar-code reader, a memory for storing and outputting dialling data read by the bar-code reader, a control unit, and a dial-speech circuit for transmitting dialling data read out from the memory over a subscriber line to the central office.

U.S. Pat. No. 4,535,204 describes a telephone dialling system with which a hand-held wand for reading subscriber numbers represented in bar-code form is associated. The hand-held wand converts the coded subscriber numbers into electrical signals which are stored and converted into dialling pulses. In this way, dialling can be carried out by reading the coded subscriber number semiautomatically with the aid of the wand. The coded subscriber number, i.e., the bar code, may be printed on advertising material together with the subscriber number in figures as dialling data or be marked on appropriate small labels which may likewise be stuck on advertising material and also into directories and notebooks.

In the foregoing case, it is complicated for the user to procure the respective bar-code label for every new subscriber number added. It has therefore been proposed to provide the telephone set with a bar-code printer. Because such a telephone set is much more expensive to procure and maintain, as well as to operate, such bar-code applications have not been successful to date.

It is an object of this invention to provide an improved telephone set utilizing bar code which overcomes the drawbacks of prior art installations and makes the advantages of the bar-code system accessible to the average user as well.

To this end, in the telephone set according to the present invention, of the type initially mentioned, the pages of the subscriber listing are divided into sections, there is space in each section for entering at least the name of a subscriber, a bar code is printed in each section, each bar code corresponds to a one- to three-digit speed-calling number for unequivocal differentiation from other dialling data, the control unit has a microprocessor programmed in such a way that the speed-calling numbers read by the bar-code reader and converted into electrical signals serve to address the other dialling data in the memory, and the control unit supplies the dialling data read out of the addressed memory location of the memory to the dial-speech circuit.

Figure 6:
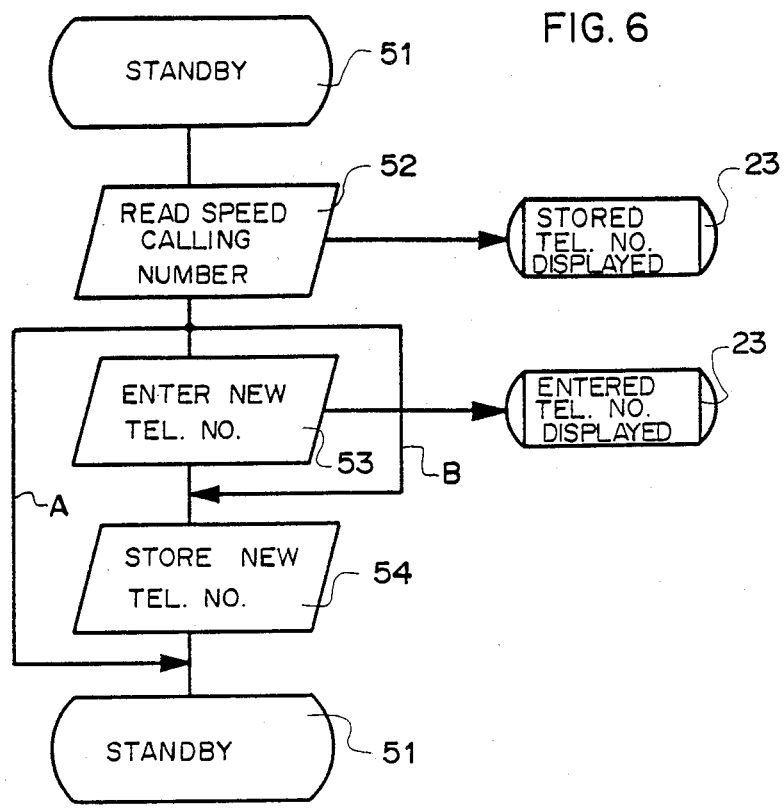
Figure 7:
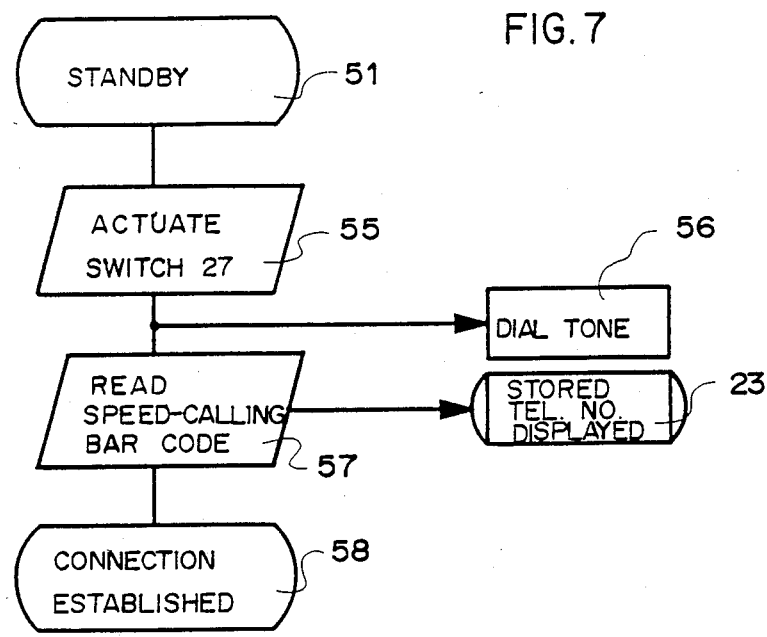

A preferred embodiment of the invention will now be described in detail with reference to the accompanying simplified and diagrammatic drawings, in which:

FIG. 1 is a top plan view of a telephone set and of the ancillary subscriber listing, FIG. 2 is a representation of a memory of the telephone set of FIG. 1, FIG. 3 is a block diagram of the telephone set, FIG. 4 is a flowchart for reading a bar code into the memory, FIG. 5 is a representation of a bar code, FIG. 6 is a flowchart for displaying, storing, or deleting subscriber number, and FIG. 7 is a flowchart of the dialling operation.

Illustrated in FIG. 1 is a subscriber listing 1 designed similarly to an ordinary notebook, only one page of which is shown in full. Each page of listing 1 is divided into sections 11 of equal size. Preprinted in each section 11 is a serial speed-calling number 12 between 100 and 999 together with the bar code 13 corresponding to that number. A user of listing 1 may enter the names and subscriber numbers 14 of the persons he or she calls most frequently and, before using it for the first time, may store these numbers, in a manner to be described below, in a memory 3 (cf. FIG. 2) of the telephone set 2.

A block diagram of the telephone set 2 illustrated in top plan view in FIG. 1 is shown in FIG. 3. Telephone set 2 is accommodated in a housing 20 in the form of a microtelephone and comprises a dial-speech circuit 4, a control unit 5, memory 3 for storing subscriber numbers 14 at memory locations 31 and 32 defined by speed-calling numbers 12, a switch 27 disposed on one side of housing 20 and acting as a hook contact, and a ringing circuit 28 with an acoustical electrical transducer 29 connected thereto. On the front of housing 20 is a key pad 22 for manual dialling and for entering the subscriber numbers to be stored in memory 3. A display 23 may be provided in an aperture in housing 20 and connected to control unit 5 via a driver circuit 35.

Disposed at one corner of housing 20 is an optical transmitter receiver 21 which, together with housing 20, forms a hand-held wand. The electrical signals generated by transmitter-receiver 21 are amplified by an amplifier 33 and supplied to a comparator 34 which delivers wide and narrow pulses to control unit 5 as a function of the bar code read out. A receiver 24 and a transmitter 25 are disposed behind respective apertures in housing 20. Key pad 22 includes an additional store key 26. Control unit 5 comprises a microprocessor 36 and a program memory 37.

FIG. 4 is a simplified flowchart of the bar-code input operation, while FIG. 5 shows a bar code divided into three parts, viz., the start code, the data code, and the stop code. The program illustrated in FIG. 4 is contained in program memory 37, which is preferably a ROM, and the start phase 40 is initiated by reading the bar code 13 (FIG. 1) by means of the bar-code wand. The bar code read is then stored in a short-term memory (not shown), and the stored information is read for recognition at 41 (FIG. 4). At the condition test 42, it is decided whether or not the start-stop code (FIG. 5) has been recognized as correct. If not, this leads to an error message 43 which is displayed by LCD 23 or indicated by other means. If the start-stop code has been recognized as valid, the data code is read for recognition at 44. At the condition test 45, it is decided whether or not the data code (FIG. 5) has been recognized as correct. If not, this likewise results in an error message 43 (FIG. 4). If the data code is valid, it is converted at 46 into the respective storage address 31 (FIG. 2). At 47, memory 3 is addressed with this storage address, and the operations described below can be executed.

FIG. 6 is a simplified flowchart for displaying, storing, or cancelling a subscriber number. In this example, the line is not busy, i.e., it is in standby condition 51. This means that switch 27 (FIGS. 1 and 3) has not been actuated. With the aid of the hand-held wand 20, 21 the speed-calling number 13 in one of the sections 11 is then read, e.g., the one for John May. For this purpose the reading operation 52 depicted in FIG. 4 is carried out, whereupon the subscriber number e.g., 298-7654, stored at the storage location in memory 3 determined by the speed-calling number, e.g., "321," is displayed by LCD 23 at 53. If it is visually verified that the subscriber number displayed is identical with that of John May in section 11, i.e., if no correction is necessary, the program returns after a certain waiting time, loop A (FIG. 6), to standby condition 51 of the subscriber line.

However, if the subscriber number is to be changed, then immediately after the reading-in 52 of the bar code and the appearance of the subscriber number in display 23, and before the mentioned waiting time has elapsed, the new subscriber number is entered. This input 53 takes place by means of key pad 22; the newly entered subscriber number 32 (FIG. 2) appears in display 23 and is stored (54) at the storage location 31 in memory 3 determined by the read-out speed-calling number through actuation of store key 26. The program then returns to the original standby condition 51 of the subscriber line. This procedure is repeated for each name when subscriber listing 1 (FIG. 1) is being made up.

If an invalid subscriber number has to be cancelled, immediately after reading 52 of the bar code 12 (FIG. 1), e.g., "323," the store key 26 is actuated according to loop B (FIG. 6). This actuation 54 results in cancelling the invalid subscriber number store at place "323," as indicated by the void space 32 in memory 3 (FIG. 3).

Once the subscriber listing is made up, the respective subscriber number can be dialled semi-automatically according to the flowchart given in FIG. 7. Starting from standby condition 51, switch 27 (FIGS. 1 and 3), corresponding to the hook contact, is actuated at 55. When the dial tone 56 from the central office is heard, read-in 57 of speed-calling number 13 from the respective section 11 takes place by means of hand-held wand 20/21. The associated subscriber number 32 (FIG. 2) read out of memory 3 is displayed by LCD 23 and converted by microprocessor 36 (FIG. 3) into dialling pulses. These pulses are supplied to dial-speech circuit 4 and on via switch 27 and the subscriber line to the central office (not shown), whereupon the connection 58 is established.

Hence for dialling a subscriber number, especially for calling a party abroad, all that is necessary after actuating switch 27 is to read the respective speed-calling bar code 13 in listing 1 by means of the hand-held wand in the form of the microtelephone itself. Dialling then takes place automatically.

FIG. 8 explains the meaning of the symbols used for FIGS. 6 and 7.

Inasmuch as a speed-calling number is bar-coded rather than the subscriber number, printing of subscriber listing 1 is a one-time operation regardless of the ever-increasing volume of frequently called numbers. Thus, the bar codes can be composed beforehand for the whole set of, say, 900 three-digit speed-calling numbers. For each production series of telephone sets 2, a corresponding number of bar-code sets are printed simultaneously and supplied together with the sets for delivery to the users.

However, the invention may also be carried out in other ways, not illustrated here.

If a bar code already exists for one or the other subscriber number, this bar code may likewise be read in instead of the whole number having to be dialled. The prerequisite for this, however, is that the control unit be able to distinguish between the two kinds of bar code. This can be achieved in various ways:

If, for instance, care is taken that the speed-calling numbers and the subscriber numbers comprise quite separate ranges of figures, this may serve as a distinguishing criterion. For instance, if all subscriber numbers and official (service) numbers are one-, two-, four-, or more digit numbers, all speed-calling numbers may be three-digit numbers.

The speed-calling bar codes may also, however, be supplemented by adding special non-standard bar-code prefixes and/or suffixes which can also be recognized and evaluated by control unit 5. For example, the so-called code 2/5 interleaved has proved satisfactory as a standard for the bar-coding of single- and multi-digit numbers.

Instead of three digits exclusively, the speed-calling code might contain at least one or more letters. Such a combination cannot, however, be represented by the code 2/5 interleaved.

When such or similar distinguishing features are used, individual numbers or commands of the key pad, e.g., 1 . . . 0, *, #, S, may also be represented in bar code. In that case, a thus-coded illustration of the key pad will preferably be printed in the subscriber listing or, as a label, pasted in that listing. The key-pad entries connected with storage or dialling operations will then be replaced by bar-code reading operations.

Subscribers with seldom-used numbers not appearing in the listing can naturally be directly dialled as usual with the aid of key pad 22.

It will be obvious that the spatial arrangement of the various components deviating from the example described may be executed as individual interconnectible modules.

By means of the telephone set described above, ordinary users can also profit by the advantages of the bar code without having to own complicated and thus expensive telephone sets.

What is claimed is:

1. A telephone set of the type having a subscriber listing containing bar codes and associated subscribers' numbers, a bar-code reader, a data memory for storing and outputting dialling data read by the bar-code reader, a control unit, a key pad, and a dial-speech circuit for transmitting dialling data read out from the data memory over a subscriber line to the central office, wherein the improvement comprises:

said subscriber listing having a plurality of pages each divided into sections, each of said sections including sufficient space for entering at least the name of a subscriber, and a bar code pre-printed in each of said sections and corresponding to a one- to three-digit speed-calling number, said control unit being so programmed that each said speed-calling number read by said bar-code reader and converted into electrical signals serves to address other dialling data in said data memory, said control unit supplying said dialling data read out of the addressed memory location of said data memory to said dial-speech circuit.

2. The telephone set of claim 1, wherein said pre-printed speed-calling number bar code includes a standardized middle portion representing said speed-calling number and a non-standard prefix and/or suffix portion, said control unit utilizing said prefix and/or suffix portions for distinguishing the respective said speed-calling number from any standard bar-code entries containing a normally bar-code subscriber number.

3. The telephone set of claim 1, further comprising a nonfixed dialling-data carrier, wherein the numerals and command symbols (1 . . . 0, *, #, S) of said key pad are printed in bar-code form on said carrier.

4. The telephone set of claim 1, wherein said control unit further comprises a program memory and a microprocessor containing programs necessary for carrying out dialling with a subscriber number read out from said data memory and for storing subscriber numbers selected by the user at memory locations of said data memory determined by said pre-printed bar codes.

5. The telephone set of claim 4, wherein said pre-printed speed-calling number bar code includes a standardized middle portion representing said speed-calling number and a non-standard prefix and/or suffix portion, said control unit utilizing said prefix and/or suffix portions for distinguishing the respective said speed-calling number from any standard bar-code entries containing a normally bar-coded subscriber number.

6. The telephone set of claim 4 further comprising a nonfixed dialling-data carrier, wherein the numerals and command symbols (1 . . . 0, *, #, S) of said key pad are printed in bar-code form on said carrier.

* * * * *

UNITED STATES PATENT AND TRADEMARK OFFICE
CERTIFICATE OF CORRECTION

PATENT NO. : 4,907,264
DATED : MARCH 6, 1990
INVENTOR(S) : CHRISTIAN SEILER ET AL.

It is certified that error appears in the above-identified patent and that said Letters Patent is hereby corrected as shown below:

In the Foreign Application Priority Data, delete "3345/87" and insert --3545/87--.

In the abstract, line 8, delete "and high or her telephone" and insert --and his or her telephone--.

Signed and Sealed this

Seventeenth Day of March, 1992

Attest:

HARRY F. MANBECK, JR.

*Attesting Officer*     *Commissioner of Patents and Trademarks*